US010378662B2

(12) United States Patent
Chapman

(10) Patent No.: US 10,378,662 B2
(45) Date of Patent: Aug. 13, 2019

(54) PRESSURE ASSISTED ROTARY PINCH VALVE

(71) Applicant: John Eric Chapman, Gray, TN (US)

(72) Inventor: John Eric Chapman, Gray, TN (US)

( * ) Notice: Subject to any disclaimer, the term of this patent is extended or adjusted under 35 U.S.C. 154(b) by 79 days.

(21) Appl. No.: 15/730,353

(22) Filed: Oct. 11, 2017

(65) Prior Publication Data

US 2018/0172166 A1 Jun. 21, 2018

Related U.S. Application Data

(60) Provisional application No. 62/406,459, filed on Oct. 11, 2016.

(51) Int. Cl.
*F16K 7/00* (2006.01)
*F16K 7/07* (2006.01)
*F16K 31/44* (2006.01)
*F16K 7/04* (2006.01)
*F16K 7/06* (2006.01)

(52) U.S. Cl.
CPC .................. *F16K 7/07* (2013.01); *F16K 7/04* (2013.01); *F16K 7/06* (2013.01); *F16K 7/063* (2013.01); *F16K 31/44* (2013.01)

(58) Field of Classification Search
CPC .... F16K 7/063; F16K 7/065; F16K 31/52491; F16K 7/07; F16K 31/44; F16K 7/04; F16K 7/06

USPC ............................................................ 251/9
See application file for complete search history.

(56) References Cited

U.S. PATENT DOCUMENTS

| 1,701,411 | A |   | 2/1929  | Kellam |
|-----------|---|---|---------|--------|
| 1,897,743 | A |   | 2/1933  | Warner |
| 2,250,122 | A |   | 7/1941  | Bjarnson |
| 2,600,493 | A |   | 6/1952  | Farris |
| 3,467,151 | A | * | 9/1969  | Vogt ........................ B65B 1/06 141/237 |
| 3,759,483 | A |   | 9/1973  | Baxter |
| 3,920,215 | A | * | 11/1975 | Knauf ................ A61M 39/285 251/251 |
| 4,582,292 | A |   | 4/1986  | Glotzback et al. |
| 4,630,635 | A | * | 12/1986 | Bernstein .................. F16K 7/07 137/315.07 |
| 4,682,755 | A | * | 7/1987  | Bernstein .................. F16K 7/07 251/252 |
| 5,441,231 | A | * | 8/1995  | Payne ..................... F16K 7/066 251/5 |
| 8,807,517 | B2 |  | 8/2014  | Townsend |
| 2012/0018654 | A1 | * | 1/2012 | Wennberg ................ F16K 7/06 251/9 |

\* cited by examiner

*Primary Examiner* — Steven O Douglas
(74) *Attorney, Agent, or Firm* — Thomas M. Joseph, Esq.

(57) ABSTRACT

A pinch valve has an upper casing support the entire pinch assembly and the lower casing. In a particular embodiment, a quarter-turn actuator is deployed and the sleeve may be removed without moving the actuator. The body may be open or closed to retain an external air pressure used to help close the sleeve and reduce actuator forces.

10 Claims, 8 Drawing Sheets

US 10,378,662 B2

PRESSURE ASSISTED ROTARY PINCH VALVE

CROSS REFERENCE TO RELATED APPLICATION

This application claims the benefit under 35 U.S.C. § 119(e) of U.S. Provisional Application No. 62/406,459 entitled "PRESSURE ASSISTED ROTARY PINCH VALVE" filed Oct. 10, 2016, which is incorporated herein by reference.

DESCRIPTION

The present disclosure relates to a pinch valve having an upper casing support the entire pinch assembly and the lower casing. In a particular embodiment, a quarter-turn actuator is deployed and the sleeve may be removed without moving the actuator.

TECHNICAL FIELD

The present disclosure relates to the field of industrial valves. More specifically, the present disclosure relates to a pinch valve having pivotably mounted to an inserted plate. The upper or lower casing may be pressurized to reduce the force required to close the sleeve and may be independently removed to easily access the valve internals.

BACKGROUND

A pinch valve generally differs from conventional valves in that, instead of having closing elements that interfere with a fluid flow, they apply pressure on a sleeve to prevent a flow. When in open position, no closing element is present within the sleeve and the flow is unimpeded by the presence of the valve. Pinch valves are frequently used in applications where solid or semi-solid material, such as powder, granules, pellets, fibers or similar material, flow within the sleeve. They may be used in soft applications, such as for example in waste water plants, or in heavy industrial applications.

Conventional mechanical pinch valves apply pressure using a movable closure bar at one point of a circumference of the sleeve, for example at the top of the circumference, flattening the sleeve towards a fixed bottom, thereby greatly deforming the sleeve. Some pinch valves use air pressure for flattening the sleeve. However, mechanically driven presses are almost always screw-driven in large part due to high forces needed to close pressurized sleeves and almost always require fully encased sleeves.

In any case, pinch valves are primarily screw driven and require an elastomer sleeve with a pinch location in the centerline of the sleeve for wear purposes. The screw-driven linear gearing significantly reduces the mechanical efficiency; and, therefore copious amounts of power are required. This significantly increases the cost of the actuator-valve combination. The presence of a screw-driven system also requires multiple turns to drive the closure bars together which can drastically effect closure times and can lead to safety concerns where fast shut-off is needed.

Therefore, there is a need for a pinch valve that meets requirements of a broad range of applications while providing ease of maintenance, reduce thrust required to close, fast maintenance, and less costly actuators.

SUMMARY

According to the present disclosure, there is provided a pinch valve for receiving a sleeve. The pinch valves comprise an upper casing, mounting plate, & lower casings for receiving the sleeve. The upper and lower casings are mounted via removable bolts. The pinch valve also comprises a gearing mechanism that pinches the sleeve by moving the upper and lower pinch elements.

The foregoing and other features will become more apparent upon reading of the following non-restrictive description of illustrative embodiments thereof, given by way of example only with reference to the accompanying drawings.

BRIEF DESCRIPTION OF THE DRAWINGS

Embodiments of the disclosure will be described by way of example only with reference to the accompanying drawings.

DETAILED DESCRIPTION

Like numerals represent like features on the various drawings. Various aspects of the present disclosure generally address one or more of the problems of providing a pinch valve able to meet requirements of heavy industrial applications while providing ease of maintenance.

The phrase "pinch valve" shall refer to a control valve using a pinching effect of an internal sleeve to obstruct a flow.

The term "sleeve" shall refer to a circular tube insertable in a pinch valve, capable of being compressed to manipulate flow.

The term "casing" shall refer to a part of a frame.

The phrase "pinch arm" shall refer to a movable part of a pinch valve for applying pressure on a sleeve.

The term "cam" shall refer to a rotational element sliding on specific points imparting motion onto other elements.

The phrase "locking element" shall refer to a device for maintaining in place a movable element.

The term "actuator" shall refer to a device for exerting a motion.

The phrase "backing plate" shall refer to a place to contain rotational motion for the gearing mechanism.

The term "bearing" shall refer to a body that reduces friction caused from rotational motion.

The phrase "gearing mechanism" shall refer to an assembly for closing the valve translating rotational motion into linear.

The phrase "valve packing" shall refer to seals around penetrations into the valve cavity.

The term "shaft" shall refer to an elongate cylindrical bar.

The term "pin" shall refer to a solid element for fastening another element.

The term "brace" shall refer to a solid piece for attachment to other elements.

The terms "upper" and "lower" shall, within the context of the present disclosure, shall be understood as relative terms applicable to a pinch valve actuated from above. The pinch valve may be installed in other configurations in which an "upper" element may be below a "lower" element or in which an "upper" and a "lower" element may be side by side.

Figure 1:
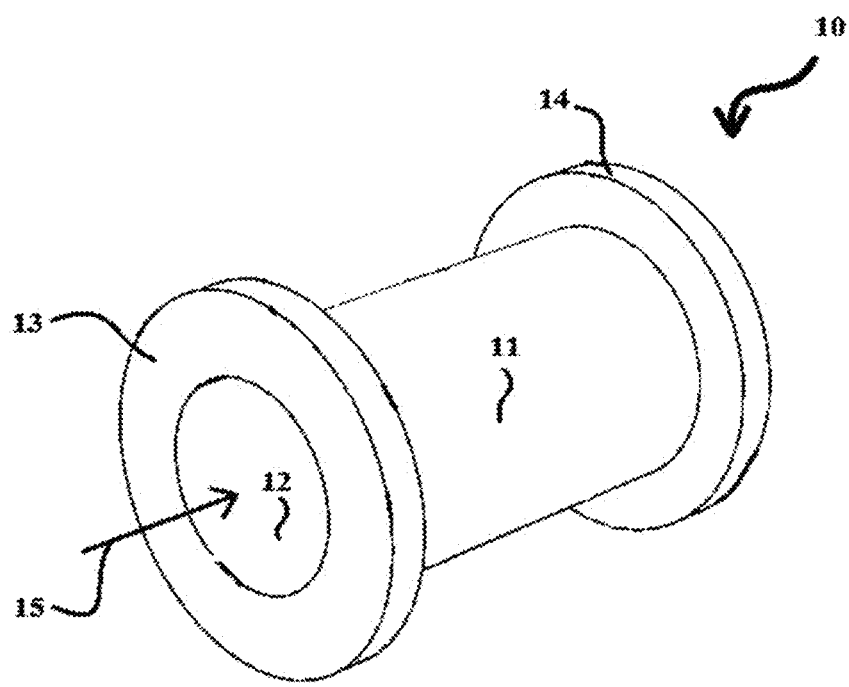
FIG. 1 is a perspective view of a sleeve for use with a pinch valve.

Referring now to the drawings, FIG. 1 illustrates a flexible sleeve, generally designated by the numeral 10, for use with a pinch valve. The sleeve 10 has a circular internal passage 12 and is terminated at both ends by flanges 13 and 14. The sleeve-body 11 modulates flow by a pinching mechanism shown in later figures below. The sleeve 10 may be compressed until the internal passage 12 to control flow. Flow can be considered as a solution moving through the valve partially or fully closed to regulate or terminate bi-directional flow longitudinally through the centerline of the valve 15.

Figure 2:
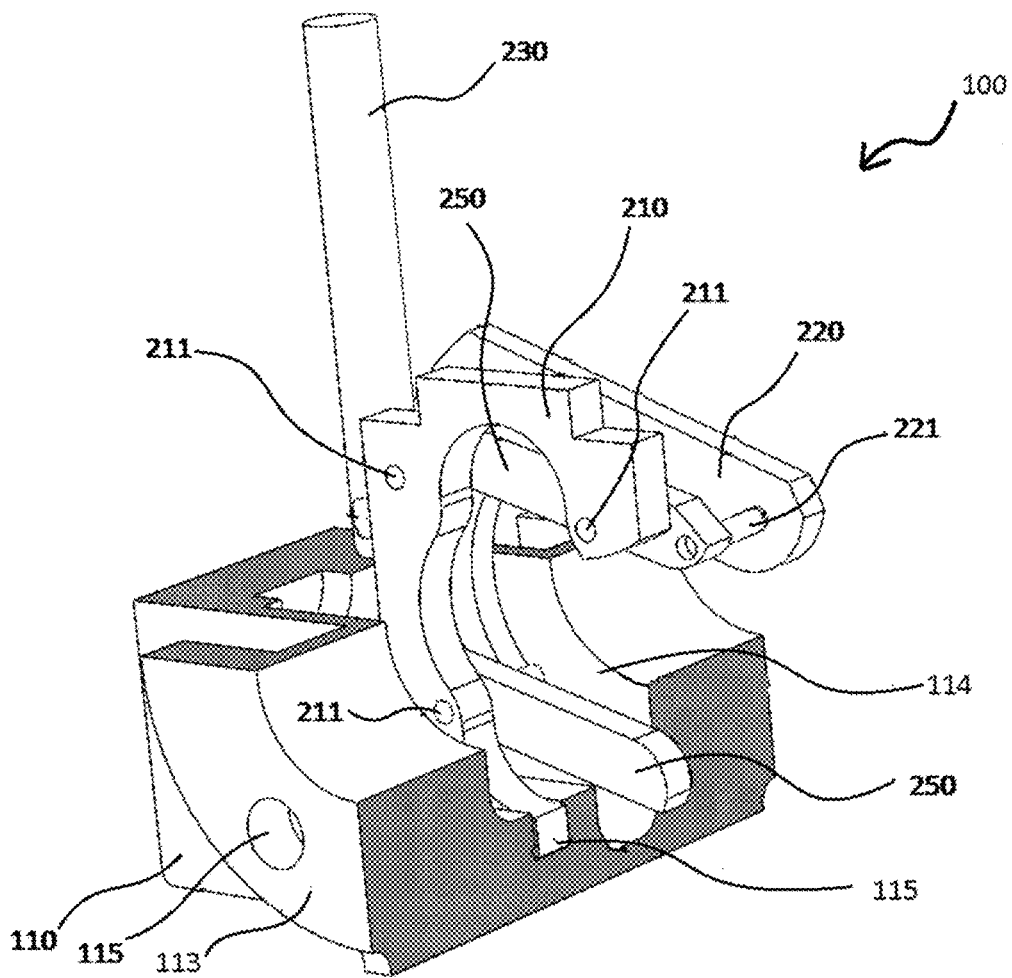
FIG. 2 is a fragmentary perspective view of a pinch valve according to an embodiment (sleeve not shown).
Figure 3:
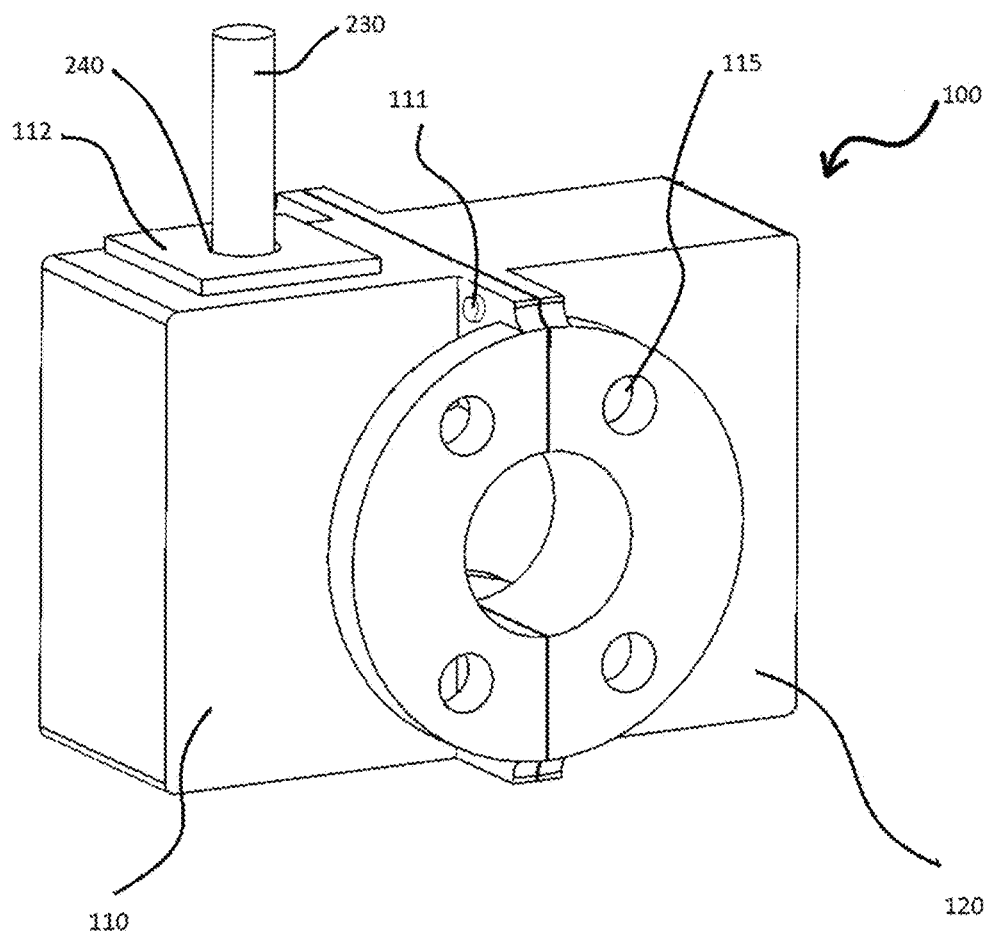
FIG. 3 is a perspective view of the pinch valve shown in FIG. 2.
Figure 4:
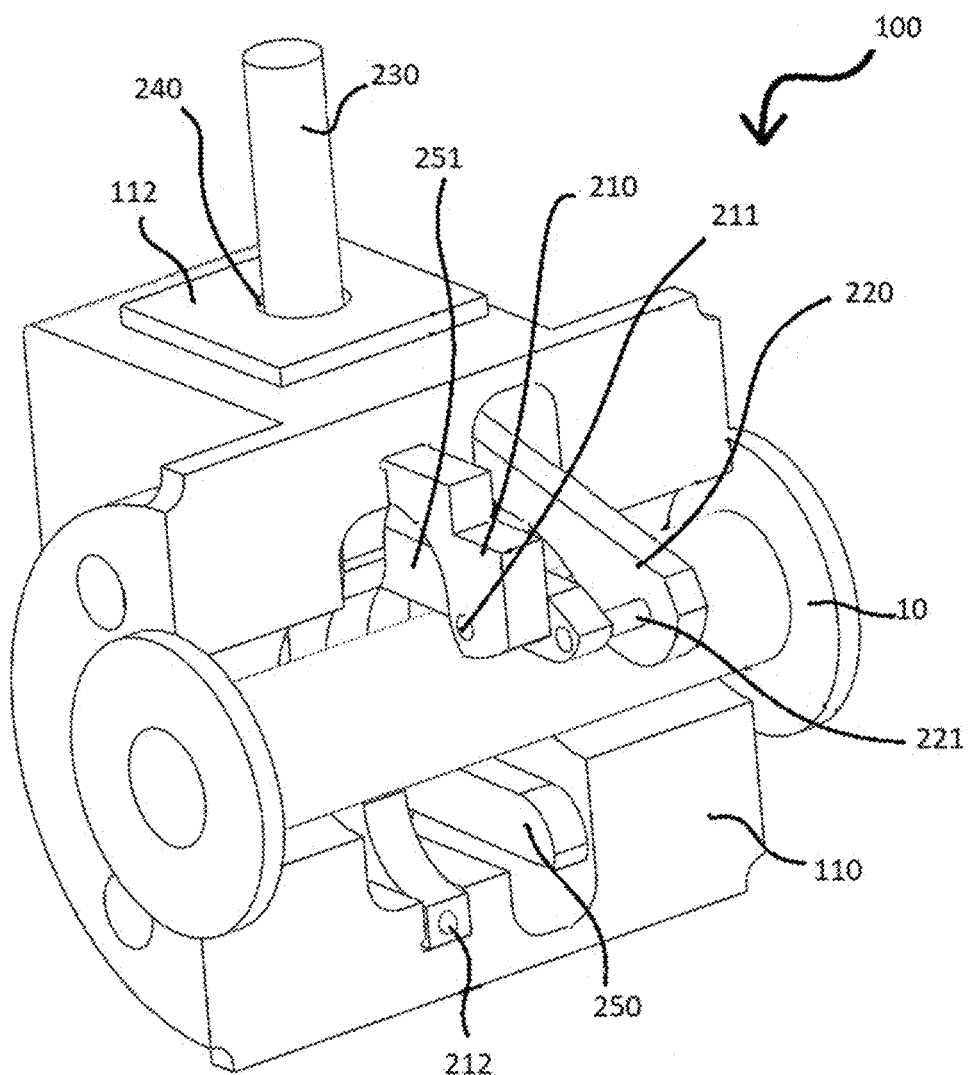
FIG. 4 is a fragmentary perspective view of an embodiment of the pinch valve shown in FIG. 2.
Figure 5:
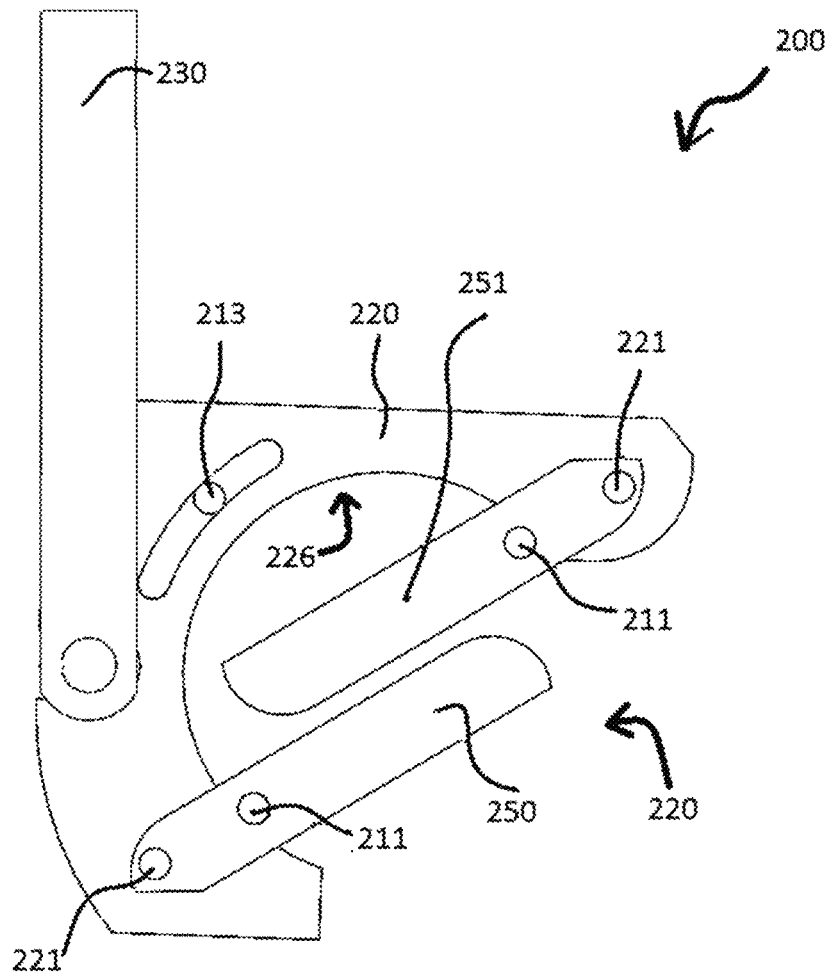
FIG. 5 is a front plan view of a rotation mechanism in a closed position.
Figure 6:
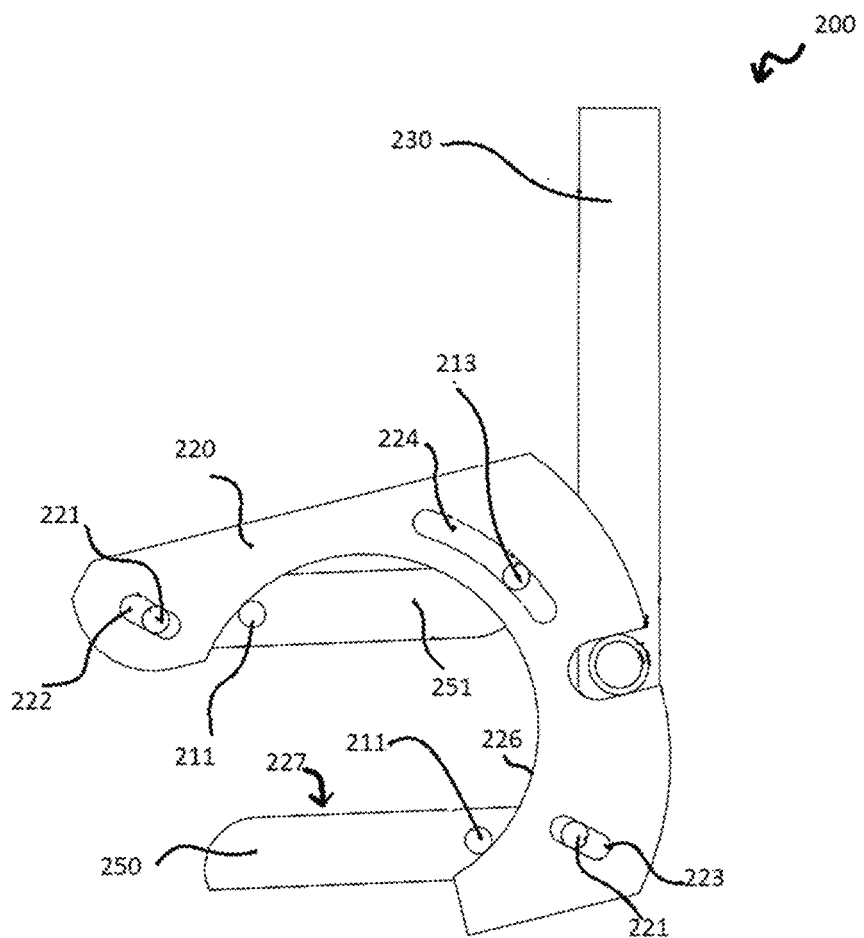
FIG. 6 is a back plan view of the rotation mechanism shown in FIG. 5 in an open position.

Referring now to FIGS. 2-6, a pinch valve, generally designated by the numeral 100, is shown in FIGS. 2-4 and a rotation mechanism, generally designated by the numeral 200, is shown in FIGS. 5-6. The rotation mechanism 200 is a component of the pinch valve 100.

The pinch valve 100 comprises an upper casing 110 and a lower casing 120. The upper casing 110 fastened by a locking element 111 connecting to the lower casing 120, an actuator brace 112 connected through removable locking elements (not shown) or welded (shown) to the upper casing and a flange 113 showing the entrance to the sleeve cavity 114. An actuator brace 112 can be seen having a penetration seal around a shaft 230 using valve packing 240 such as gaskets, O-rings, pastes, or glues will readily come to mind to those of ordinary skill in the art having the benefit of the present disclosure. The shaft 230 can be a guiding shaft. The upper casing 110 may further comprised of a built-in or removable backing plate 210 extending to contain the cam 220.

As shown in FIGS. 2 and 4, the backing plate 210 fixates the gear mechanism 200 via identical inside race pins 211 and a slot pin 213 around the centerline axis. These pins 211 and 213 can be increased in number, specially manufactured or replaced using a variety of methods to secure the cam in places, such as but not limited to bearings, bushings, slotted pins, or braced planetary gears for larger inner race pin diameters, to create secure pivot points for the cam mechanism to slide concentrically around the longitudinal centerline axis 15 to drive the pinch arms 250 and 251 open or closed in order to control flow.

The cam 220, shown in FIGS. 5-6, has pivot slots 222-223 and a rotational slot 224 to guide the cam 220 while being manipulated by the drive slot 225 to open and close the valve 100 shown in FIGS. 2-4. This closing action is created by rotating the pinch arms 250 and 251 around the pins 211 using the lever pins 211; using the pins 211 as a fulcrum point.

Figure 7:
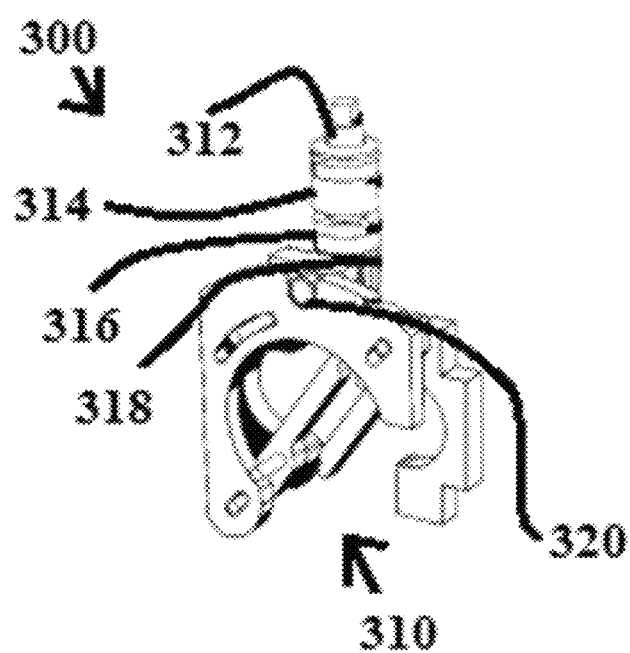
FIG. 7 is a perspective view of an alternative embodiment of a pinch valve (body not seen).
Figure 8:
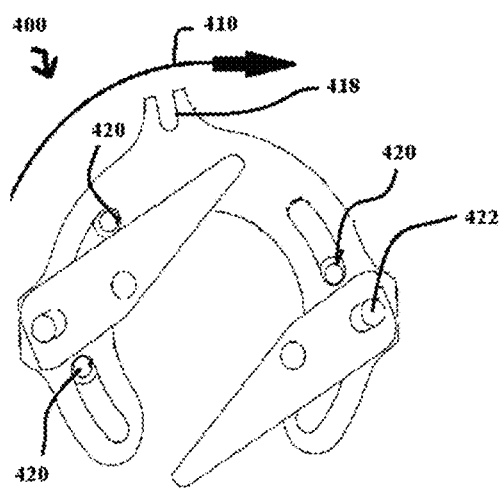
FIG. 8 is a top plan view of an open cam rotational scheme in an open position.
Figure 9:
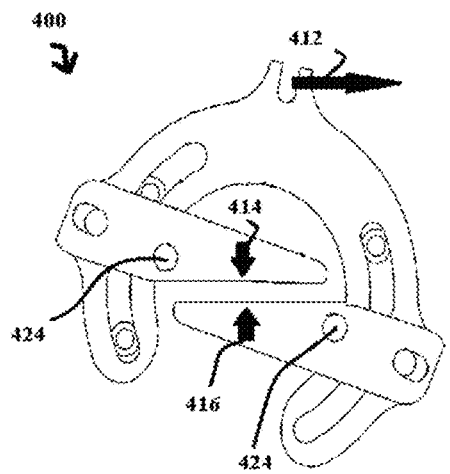
FIG. 9 is a top plan view of an open cam rotational scheme in a closed position.

As shown in FIGS. 5-6, the front (open) and back view (closed) of the internal cam mechanism connected to back-driven lever arms via the pins 211 and 213, and rotated by a shaft 230. The shaft 230 is linearly driven. As shown in FIGS. 7-9, other actuation methods can be implemented in other embodiments.

As shown in FIGS. 2-4, the pinch valve 100 is built for accommodating external conduits have an internal passage 14 with a diameter of about 2 inches. The corresponding linear stroke of the shaft 230 of about 0.5 inches represents a 1:4 ratio of stroke to close distance. It should be understood that dimensions discussed herein are for illustration purposes and are not limiting the present disclosure.

As shown in FIGS. 5-6, through manipulation of the distance between the cam slot 225 and the centerline axis 15 that the stroke required to close the valve 100 can be manipulated. It may also be seen that the manipulation of distance between the drive slots 221 and the pins 211 will also affect the stroke length.

The sleeve removal space 227 is created by removing the lower casing 111. The upper casing 110 may support the entire rotational mechanism through a fixation point 212; the entire valve packing system; and an actuator via an actuator brace 112 connected through a shaft 230. This can remain in place as the lower casing 111 is removed by disassembling bolts from the flange bolt holes 115 to access a replaceable sleeve 10, shown in FIG. 1, which can be removed without further manipulation of internal components.

The synchronized gearing mechanism 200 comprises of both pinch arms shown connected on its inner rim 226 to the backing plate 210 or the pins 211 and 213. The shaft 230 is a representation of a piston shaft supported by the actuator brace 112. The shaft 230 used for actuation of the pinch valve 100 may be replaced by a screw-driven system to convert the valve into a manually operated variant.

Besides the screw driven system, other mechanisms (not shown) may be used to drive rotation into linear motion of the shaft 230: the rotation mechanism 200 may be driven by an actuator comprising any one of (i) a mechanical system, (ii) an electrical system, (iii) a pneumatic system, (iv) a hydraulic system, (v) rack & pinion, or (vi another gear system. Regardless of the drive method used to rotate the cam 220, the rotational movement is translated to the pinch arms 250 and 251 until coming to a closed position FIG. 5 after meeting the sleeve 10. The pinch arms 250 are moved in synchronization as the rotational cam 220 is one piece. As a result, the pinch arm 250 moves down as the pinch arm 251 moves up, thereby constricting the sleeve 10.

In operation, the forces to overcome the pinching force required on the internal forces for the pressurized sleeve 10. This may require large actuation forces. Of course, a variant in which the internal cavity 114 can be pressurized to assist in overcoming internal pressures from flow within the sleeve 10 with actuation by use of a nozzle penetrating either the upper 110 or lower 111 casing and is within the scope of the present disclosure.

Though the present disclosure illustrates a pinch valve having the shown upper and lower casings forming an open-cam support within an enclosed frame, the present teachings are equally applicable to any pinch valve having an externally driven pinch arm levers driven from a closed-cam frame with open frame construction.

Referring now to FIG. 7, an alternative embodiment of a pinch valve, generally designated by the numeral 300, is shown. The pinch valve 300 includes sleeve removal space 310, a blow-out prevention square stem 312, upper packing 314, lower packing 316, rack and pinion 318, and drive slot 320.

Referring now to FIGS. 8-9, an open cam, generally designated by the numeral 400, is shown. The open cam 400 can be rotated by force 410 in an open position and by forces 412-416 in the closed position. The open cam 400 includes drive slot 418, rotational guides 420, arm drive 422, and pivot pins 424.

Those of ordinary skill in the art will realize that the descriptions of the pinch valve are illustrative only and are not intended to be in any way limiting of an open-cam pinch valve system. Other embodiments will readily suggest themselves to such persons with ordinary skill in the art having the benefit of the present disclosure. Furthermore, the disclosed pinch valve may be customized to offer valuable solutions to existing needs and problems of pinch valve maintenance.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

It is to be seen that the present invention is not constricted to the embodiments described above, but rather encompasses all embodiments within this, the subjoined claims and their equivalents.

What is claimed is:

1. A pinch valve apparatus for controlling fluid flow through a replaceable sleeve, the apparatus comprising:
   a removeable frame,
   a removeable open cam rotational mechanism mounted on the removable frame for rotation thereon,
   a pair of lever arms having the replaceable sleeve positioned therebetween,
   a first pair of pins pivotally connecting the removeable open cam rotational mechanism to the pair of lever arms,
   a second pair of pins projecting from the pair of lever arms and abutting the removeable open cam rotational mechanism, and
   an actuator,
   wherein the actuator drives the removable open cam rotational mechanism to drive the second pair of pins to drive the pair of lever arms together to squeeze the replaceable sleeve.

2. The pinch valve apparatus of claim 1, wherein the open cam rotational mechanism defines a slot and includes:
   a slot pin for inserting into the slot form a rotational guide for the open cam rotational mechanism.

3. The pinch valve apparatus of claim 1, wherein the actuator is a linear actuator.

4. The pinch valve apparatus of claim 1, further comprising:
   casing for enclosing the removeable frame with the casing.

5. The pinch valve apparatus of claim 4, wherein the casing includes upper casing and lower casing.

6. The pinch valve apparatus of claim 4, further comprising:
   a shaft connecting the actuator to the removeable open cam rotational mechanism, and
   a brace mounted on the casing for supporting the shaft.

7. The pinch valve apparatus of claim 1, wherein the removeable open cam rotational mechanism includes an essentially C-shaped member that surrounds the replaceable sleeve, at least partially.

8. The pinch valve apparatus of claim 1, further comprising:
   a backing plate abutting the pair of lever arms.

9. A removeable gear mechanism for pinch valve apparatus for controlling fluid flow through a replaceable sleeve, the gear mechanism comprising:
   a removeable open cam,
   a first pair of pins projecting from the open cam,
   a pair of lever arms pivotally mounted on the first pair of pins movable from a closed position for squeezing the replaceable sleeve to an open position for releasing the replaceable sleeve, and
   a second pair of pins projecting from the pair of lever arms and abutting the removeable open cam to guide the pair of lever arms.

10. The pinch valve apparatus of claim 9, wherein the open cam defines a slot and includes:
    a slot pin for inserting into the slot form a rotational guide for the open cam.

* * * * *